US005744789A

United States Patent [19]
Kashi

[11] Patent Number: 5,744,789
[45] Date of Patent: Apr. 28, 1998

[54] BAR-CODE READER

[75] Inventor: Motofumi Kashi, Chofu, Japan

[73] Assignee: Tohken Co., Ltd., Tokyo, Japan

[21] Appl. No.: 589,611

[22] Filed: Jan. 22, 1996

[30] Foreign Application Priority Data

Feb. 3, 1995 [JP] Japan .................... 7-037821

[51] Int. Cl.$^6$ ........................... G06K 7/10
[52] U.S. Cl. ...................... 235/472; 235/462
[58] Field of Search .................. 235/462, 472

[56] References Cited

U.S. PATENT DOCUMENTS

| | | | |
|---|---|---|---|
| 4,721,849 | 1/1988 | Davis et al. | 235/472 |
| 4,801,789 | 1/1989 | Davis | 235/472 |
| 5,383,111 | 1/1995 | Homma et al. | 364/401 |
| 5,468,952 | 11/1995 | Alexander et al. | 235/472 |
| 5,521,369 | 5/1996 | Kumar | 235/462 |
| 5,554,822 | 9/1996 | Gilpin et al. | 174/52.3 |
| 5,664,228 | 9/1997 | Mital | 235/380 |
| 5,664,231 | 9/1997 | Postman et al. | 235/472 |
| 5,671,374 | 9/1997 | Postman et al. | 235/472 |

FOREIGN PATENT DOCUMENTS 3-248287  11/1991  Japan ..................... 235/472

*Primary Examiner*—F. L. Evans
*Attorney, Agent, or Firm*—Wenderoth, Lind & Ponack

[57] ABSTRACT

In a bar-code reader of the present invention, data of a bar-code can be inputted easily into a personal computer without any limits on the area in which it can be used. The bar-code reader includes the functions of a PC card. A reading section for reading the data of the bar-code is formed on one corner portion of a body of the bar-code reader. Ten keys for inputting an instructions, such as for registering, deleting, or displaying of the data of the bar-code, or for guidance, are formed on an upper surface of the body of the bar-code reader. A displaying section formed of a liquid crystal for displaying predetermined information is also formed on the upper surface thereof. Furthermore, formed in a shorter side of the body are terminals for connecting the bar-code reader to the personal computer when the bar-code reader is inserted into a PC card slot formed in the personal computer.

5 Claims, 4 Drawing Sheets

BAR-CODE READER

BACKGROUND OF THE INVENTION

The present invention relates to a bar-code reader which reads out data expressed in a bar-code, and which has functions, such as for registering and displaying the aforementioned data by manipulating keys, and more particularly, to a bar-code reader which can be used as a PC card equipped with functions such as a RAM board of a personal computer.

The recent years, in order to recognize in a short time, information such as numbers, article names, or prices of products and parts, a bar-code in which information such as the numbers, article names, and prices of the products and parts are symbolized with stripe patterns composed of black and white lines has been widely used. In such a bar-code, a series of numerals are expressed with combinations of various width ratios of the black and white lines so that the information such as the numbers, article names, and prices of the products and parts are expressed by being replaced by the aforementioned numerals.

Data expressed by the bar-code is read out by a device called a bar-code reader. The bar-code reader is a device which irradiates light onto the bar-code and receives the light reflected from the stripe patterns composed of the black and white lines. The black and white lines have a different reflectance. The bar code reader also decodes the intensity of the reflected light from the patterns into the original numerals. In such a bar-code reader, there are three types: (1) a bar-code reader of a first type which adopts a pen style in which a head with a reading section has a shape like a pen and the bar-code is traced using the head; (2) a bar-code reader of a touching style in which a head with a reading section is touched with the bar-code; and (3) a bar-code reader of a fixed style in which products with the bar-code attached thereto are passed over a reading window. A light emitting diode is mainly used as a light source for the bar-code readers of the pen and touching styles, and a laser beam is used as a light source for the bar-code of the fixed style.

FIG. 1 is a perspective view showing a first example of a bar-code reader of a widespread handy type employing a touching style. A body 10 of the bar-code reader consists of two rectangular solid components, and both rectangular solid components meet at their end portions at an obtuse angle, which is greater than a right angle. One end portion of one rectangular solid component of the body 10 is provided with a bar-code reading section 11, and an upper surface portion of the other rectangular solid component of the body 10 is provided with a plurality of ten keys 12 used to input an instruction, such as for registering, deleting, or displaying data of the bar-code, or for guidance. A display section 13 composed of a liquid crystal and the like to display prescribed matters is also provided on the upper surface portion of the other rectangular solid component of the body 10.

When using the aforementioned bar-code reader, the user holds one rectangular solid component of the body 10 in one hand, and presses the reading section 11 against the barcode. The reading section is formed on the end portion of one rectangular solid component of the body 10. Then, the user pushes a trigger button 14 formed on a side surface portion of the body 10. Immediately after the trigger button 14 is pushed, the bar-code is read out by the reading section 11. The user inputs instructions, such as for the registration and display of data of the bar-code, by pushing the prescribed ten keys 12.

FIG. 2 is a perspective view showing a second example of a bar-code reader of a widespread handy type employing a touching style. A body 20 of the bar-code reader of the second example has a shape like a pistol composed of two rectangular solid components, a sectional view of which discloses a shape like an L-character. A reading section 21 for reading a bar-code is formed on an end portion of one rectangular solid component of the body 20. A plurality of ten keys 22 for inputting instructions, such as for registering, deleting, or displaying the read out data, or for guidance, which concern the bar-code, are formed on a side surface of the other rectangular solid component of the body 20. A display section 23 made of a liquid crystal and the like for displaying prescribed matters is also formed on the side surface of one rectangular solid component of the body 20.

When using the aforementioned bar-code reader, the user holds the other rectangular solid component of the body 20 with the plurality of the ten keys 22 in one hand, and presses the reading section 21, which is formed on the end portion of one rectangular solid component of the body 20, against the bar-code. Then, the user pushes a trigger button 24 formed in an inside corner portion of the body 20. Since the bar-code is read out by the reading section 21, the user pushes the prescribed ten keys 22 to input the instructions, such as for the registration and display of the data of the bar-code.

The aforementioned bar-code reader has been widely used at check-out counters in supermarkets or department stores, or the like, as in a POS system (a Point of Sale System). When the bar-code reader reads the bar-code at the checkout counter, a personal computer outputs momentarily the price of the article, since the personal computer already has such information stored within. Furthermore, the information concerning an article which has passed through the check-out counter is inputted momentarily to the personal computer. Therefore, operations at the check-out counter are able to be performed at approximately twice the speed, and erroneous operations in inputting data regarding prices to the register do not occur. In addition, the types and quantities of articles which are currently being sold can be checked immediately so that it is possible to order articles speedily and accurately. Hence, it is possible to avoid the occurrence of a situation in which excessive quantities of unnecessary stock are maintained.

When the data read out from the bar-code using the aforementioned bar-code reader is inputted to the personal computer, the personal computer has to be equipped with an interface such as RS232C, and the bar-code reader and the interface have to be connected by a cable. Therefore, there has been a drawback in that the cable length is restricted for good data transmission so that the usage of the bar-code reader is thus limited to operation within a certain range.

Furthermore, there has also been a drawback in that the interface and the cable are necessary parts for data transmission, thus resulting in increased costs.

SUMMARY OF THE INVENTION

The present invention is intended to address the foregoing circumstances. The object of the present invention is to provide a bar-code reader which is capable of inputting data regarding a bar-code to a personal computer easily without limitations on the area in which the bar-code reader can be used.

The present invention relates to a bar-code reader which reads out data expressed on a bar-code and has functions, such as registering and displaying the read out data. The foregoing objects are achieved by a bar-code reader which is equipped with a PC card function and registers the aforementioned read out data in a memory means which is one of the functions of the PC card.

Furthermore, the object of the present invention is achieved by providing an attachment/detachment section which detachably connects the PC card to the bar-code reader and by registering in a memory means, built in the PC card, the data read out when the PC card is positioned in to the attachment/detachment section.

Furthermore, the foregoing object is achieved by adapting the PC card integrally to the bar-code reader.

BRIEF DESCRIPTION OF THE DRAWINGS

These and other objects of the present invention will be seen by reference to the following detailed description, taken in accordance with the accompanying drawings, in which.

DESCRIPTION OF THE PREFERRED EMBODIMENTS

A bar-code reader of the present invention is constructed such that has PC card functions or it is integral with the PC card. When inputting of data read out from a bar-code into a personal computer is carried out, the read out data is first registered in a memory means which is one of the PC card functions. Thereafter, the bar-code reader or the PC card is simply inserted in a PC card slot of a personal computer. Therefore, a cable connection between the personal computer and the bar-code reader is not required.

Furthermore, since the bar-code reader is designed such that the PC card is detachably connected thereto, when inputting of the read out data into the personal computer is carried out, the data is first registered in the memory means of the PC card. Thereafter, the PC card is detached from the bar-code reader and simply inserted into the PC card slot of the personal computer. Also as a result in this case, the connection between the personal computer and the bar-code reader is not required.

Since the present invention adopts a bar-code reader equipped with bar-code functions, a common PC card will be explained before an explanation of a bar-code reader of the present invention.

Figure 3:
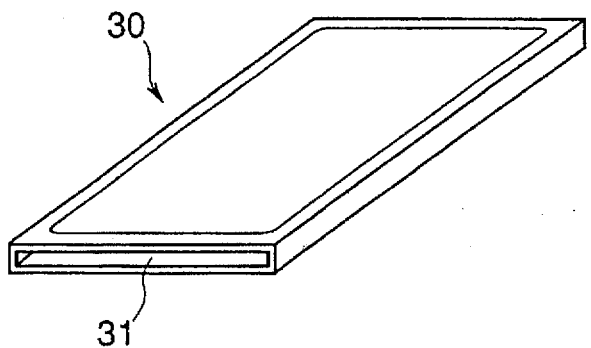
FIG. 3 is a perspective view showing an example of a prior art PC card.

FIG. 3 is a perspective view showing an example of a common PC card. The PC card is called a PCMCIA/JEIDA card, and it is principally used for personal computers of a note-book type. This PC card is constituted by installing functions of an extensive board of a personal computer of a desk-top type into a card with a size approximately as large as a credit card. The PC card conforms to standards of the PCMCIA and the JEIDA. Functions such as a RAM board, a hard disk device, a modem, and a LAN board are installed in a card of 85.6 mm by 54 mm in size, whose terminals of 68 pins are arranged along a shorter side 31 of a body 30 of the PC card. The PC card includes three standardized types with respect to a thickness, that is, Type I (3.3 mm), Type II (5.0 mm), and Type III (10.5 mm).

Figure 4:
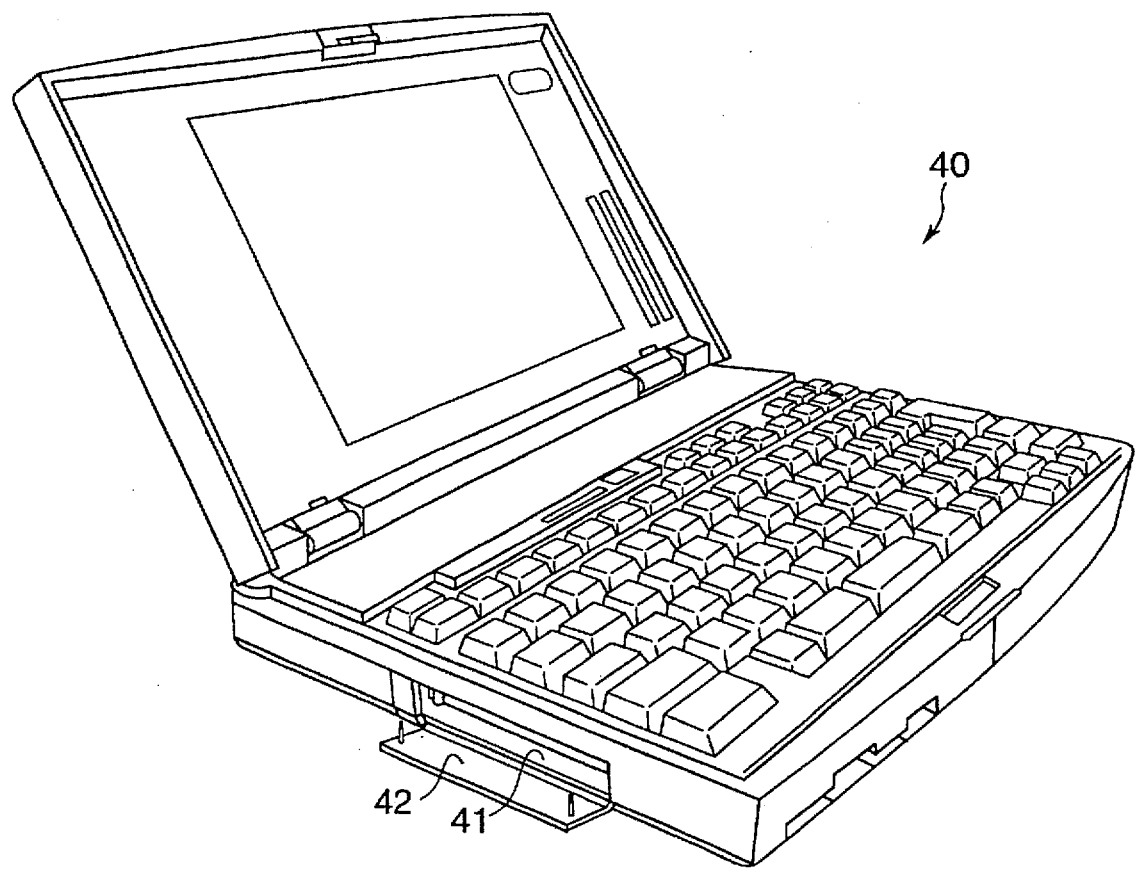
FIG. 4 is a perspective view showing an example of a prior art personal computer which is connected to the PC card.

The way the aforementioned PC card is used is as follows. Beginning from the shorter side 31 of the body 30, the insertion of the PC card into the PC card slot 41 on a side surface of the personal computer 40 of a notebook type shown in FIG. 4 is performed. It should be noted that the PC card slot 41 in FIG. 4 shows the state where a protection cover 42 is opened.

Figure 5:
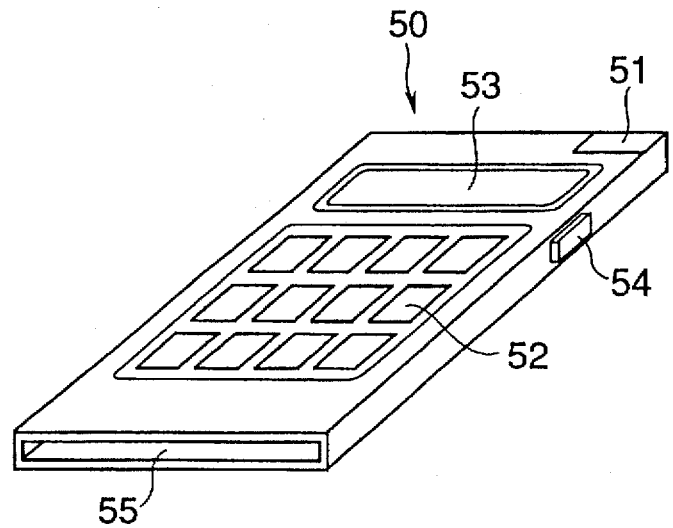
FIG. 5 is a perspective view showing a first embodiment of a bar-code reader of the present invention.

FIG. 5 is a perspective view showing a first embodiment of a bar-code reader of the present invention. This bar-code reader is constituted so as to be the same in shape and size as the aforementioned PC card. The bar-code reader of this embodiment has the functions of the PC card. A reading section 51 for reading out the data of the bar-code is formed at one corner portion of a body 50 of the bar-code reader. Ten keys 52 for inputting instructions, such as for registering, deleting, or displaying the data read out from the bar-code, or for guidance, are formed on the upper surface of the bar-code reader. A display section 53 is also formed thereon. Furthermore, terminals to be connected to the personal computer after the insertion of the body 50 into the PC card slot 41 are formed on a shorter side 55 of the body 50.

When the user uses the above described bar-code reader, the user holds the body 50 of the bar-code reader in one hand. While pushing a trigger button 54 formed on the side surface of the body 50 of the bar-code reader, the user traces the bar-code with the reading section 51 formed at one corner of the body 50. Then, since the bar-code is read out by the reading section 51, the user inputs the instruction, such as for the registration and the displaying of the data read out from the bar-code by pushing a prescribed ten key 52. The read out data of the bar-code is registered in the memory means which is one of the functions of the PC card. After completion of the registration of the data read out from the bar-code, the user inserts the bar-code reader into the PC card slot formed in the personal computer to connect the bar-code reader to the personal computer. Thereafter, the data of the bar-code registered in the bar-code reader is accepted by the personal computer when the personal computer is operated according to predetermined manipulations.

Figure 6:
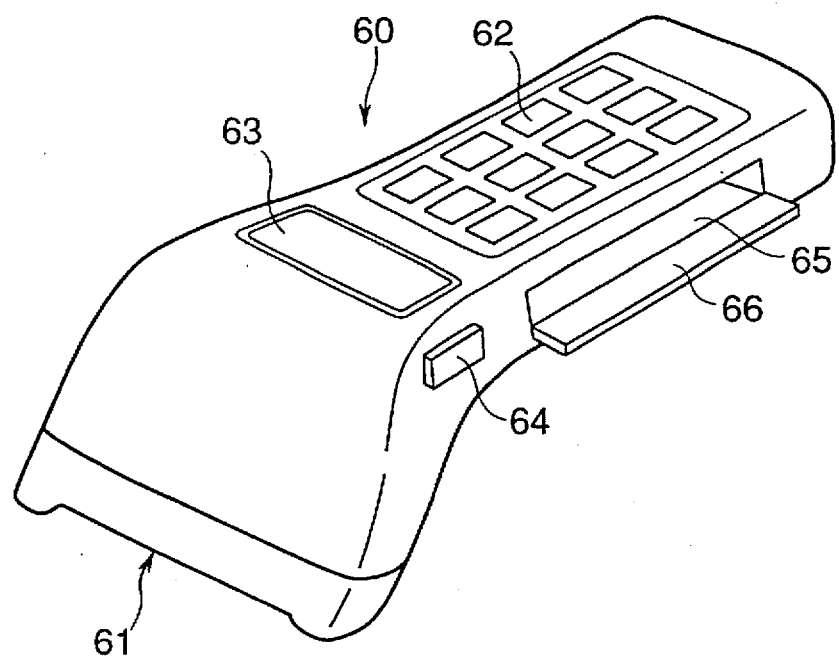
FIG. 6 is a perspective view showing a second embodiment of a bar-code reader of the present invention.

FIG. 6 is a perspective view of a second embodiment of a bar-code reader of the present invention. The bar-code reader shown in FIG. 6 is one which is applied to the bar-code-reader of the handy type employing the touching style shown in FIG. 1. An attachment/detachment section 65 is formed on the side surface of a body 60 of the bar-code reader. The attachment/detachment section 65 serves to accept the PC card therein to connect it to the body 60. It should be noted that the attachment/detachment section 65 in FIG. 6 shows the situation in which a protection cover 66 is opened.

When the user uses this bar-code reader, the user first inserts the PC card into the attachment/detachment section 65 formed on the side surface of the body 60 to connect the PC card to the body 60. Subsequently, the user holds the end portion of the body 60 one hand, and presses the reading section 61 formed on the other end portion of the body 60 against the bar-code. Then, the user pushes the trigger button 64 formed on the side surface of the body 60. With these operations, since the bar-code is read out by means of the reading section 61, the user then inputs instructions for the registration, displaying and the like of the data of the bar-code by pushing the prescribed ten key 62. The data read out from the bar-code is registered in the memory means of the PC card. After completion of the registration of the data of the bar-code, the user detaches the PC card from the attachment/detachment section 65 formed on the side surface of the body 60. Then, the user inserts the PC card into the PC card slot of the personal computer so that the PC card is connected to the personal computer. Further, by performing the predetermined manipulations for the personal computer, the data registered onto the PC card is accepted by the personal computer.

Figure 2:
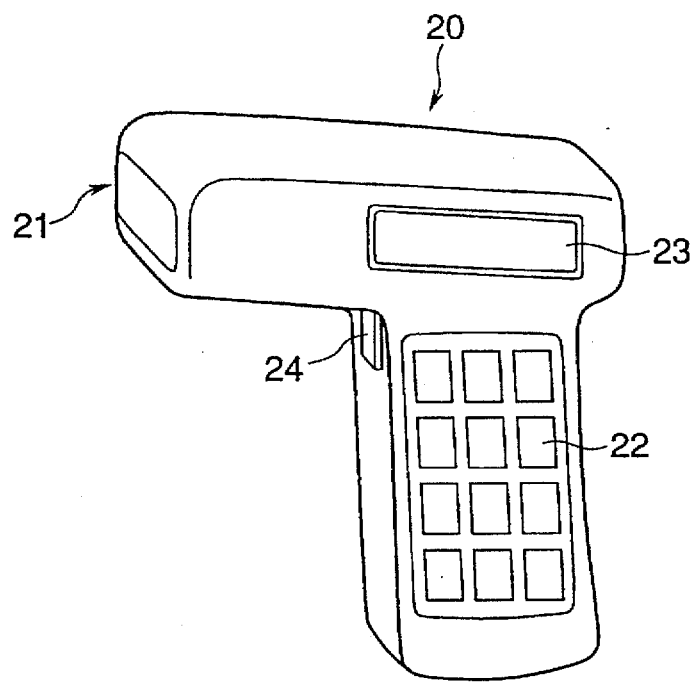
FIG. 2 is a perspective view showing a second example of a prior art bar-code reader.

It should be noted that the constitution of this embodiment is applicable to the bar-code reader of the handy type employing the touching style shown in FIG. 2.

Figure 1:
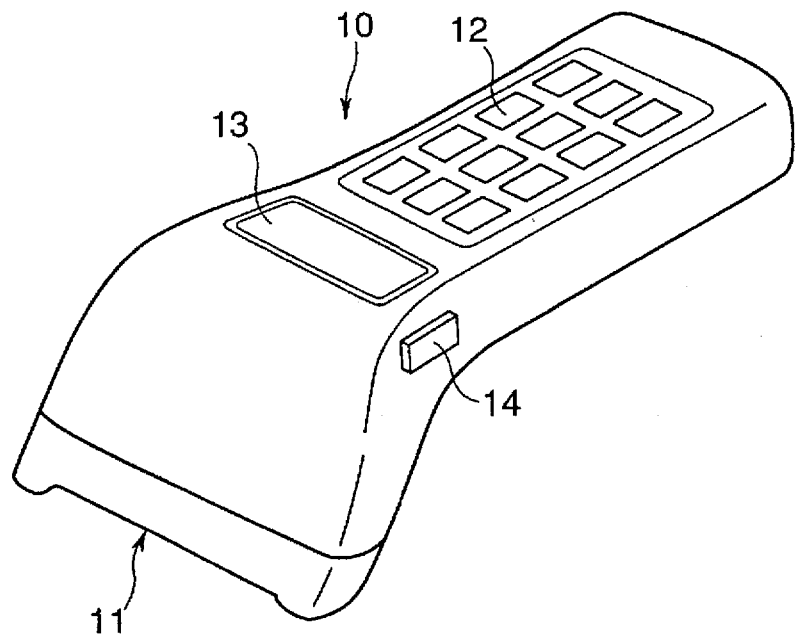
FIG. 1 is a perspective view showing a first example of a prior art bar-code reader.
Figure 7:
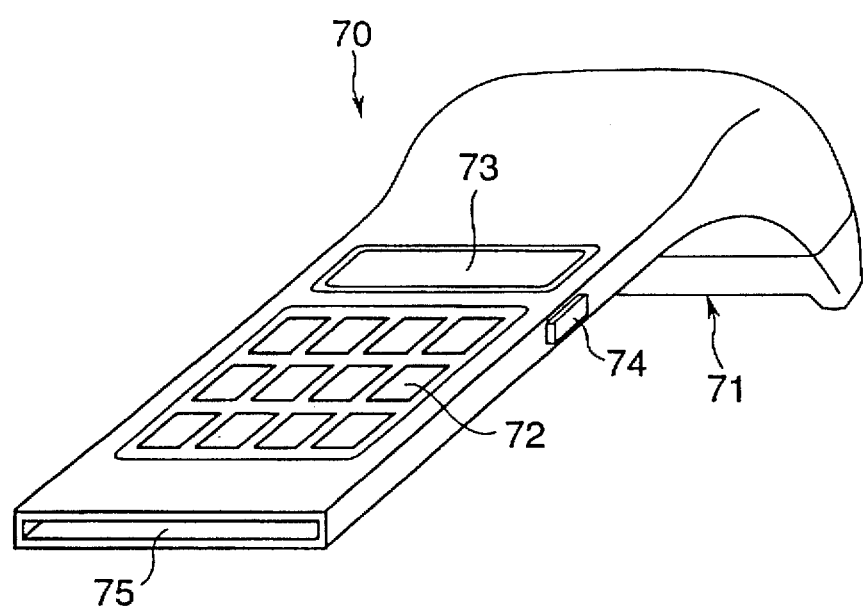
FIG. 7 is a perspective view showing a third embodiment of a bar-code reader of the present invention.

FIG. 7 is a perspective view showing a third embodiment of a bar-code reader of the present invention. The bar-code reader is one obtained by modifying the bar-code reader shown in FIG. 5. In the bar-code reader of FIG. 5, the reading section is formed at one corner portion of the body 50. In this embodiment, the reading section 71, having the same constitution as that of the reading section 11 shown in FIG. 1, is attached to a shorter side of the body 70 so as to be integrated with the body 70. The shorter side of the body is opposite to the shorter side 75 of the body 70. In the shorter side 75, terminals are formed for connecting the bar-code reader to the personal computer by inserting the bar-code reader into the PC card slot.

When the user uses this bar-code reader, the user holds the body 70 in one hand, and presses the reading section 71 integrally attached to the shorter side of the body 70 against the bar-code. Then, the user pushes the trigger button 74 formed on the side surface of the body 70. With such operations, since the bar-code is read out by means of the reading section 71, the user pushes the prescribed ten key 72 to input the instructions, such as for the registration and the display of the data of the bar-code. The data read out from the bar-code is registered in a memory means which is one of functions of the PC card. When the registration of the data is completed, the user inserts the bar-code reader into the PC card slot formed in the personal computer so that the bar-code reader is connected to the personal computer. Then, by prescribed operations for the personal computer, the data of the bar-code registered in the bar-code reader is accepted by the personal computer.

It should be noted that the reading section 71 of this embodiment may be replaced by the reading section of the bar-code reader of the handy type employing the touching style shown in FIG. 2.

In each of the embodiments, if the PC card of the bar-code reader possesses a function for transmitting data using a modem, the bar-code reader of the present invention is able to cope with data transmission over a longer distance.

As described above, the bar-code reader of the present invention is able to input data of the bar-code to the personal computer easily without any on the area of usage so that the facility of carrying can be remarkably enhanced and an application area can be expanded.

What is claimed is:

1. A portable card type bar-code reader which reads out data expressed in a bar-code and has the functions of a PC card, said portable card type bar-code reader comprising:

a housing having the shape and size of a PC card;

a reading section for reading data expressed in a bar code;

a memory disposed in said housing and operatively connected to said reading section for storing information read by said reading section;

a display section formed in an outer wall of said housing for displaying data; and a key pad located on an upper planar surface of said housing for inputting instructions to register, delete or display data stored in said memory.

2. The portable card type bar-code reader as claimed in claim 1, further comprising a battery disposed in said housing, said battery serving as a power source.

3. The portable card type bar-code reader as claimed in claim 1, further comprising terminals formed in a portion of said housing, said terminals being connectable to a personal computer when said portable card type bar-code reader is inserted into a PC card slot of the personal computer.

4. A portable bar-code reader which reads out data expressed in a bar-code, said portable bar-code reader comprising:

a reading section for touching a bar code and reading out information;

a housing having the shape and size of a PC card, said housing being integrally mounted on said reading section and including a display, a memory operatively connected to said reading section, and a key pad provided in an upper planar surface of said housing, wherein said key pad is operable such that a user can input instructions to register and display data read out from bar codes by said reading section.

5. The portable bar-code reader as claimed in claim 4, further comprising terminals, formed in a portion of said housing, for connecting said bar-code reader to a personal computer upon insertion therein.

* * * * *